(12) United States Patent
Masaka et al.

(10) Patent No.: US 9,178,226 B2
(45) Date of Patent: Nov. 3, 2015

(54) FUEL CELL SEALING STRUCTURE

(75) Inventors: Takeshi Masaka, Fujisawa (JP);
Yoshihiro Kurano, Fujisawa (JP);
Shinichiro Taguchi, Fujisawa (JP);
Kenichi Kikuchi, Fujisawa (JP);
Tetsuya Urakawa, Fujisawa (JP)

(73) Assignee: NOK Corporation (JP)

( * ) Notice: Subject to any disclaimer, the term of this patent is extended or adjusted under 35 U.S.C. 154(b) by 788 days.

(21) Appl. No.: 13/378,642

(22) PCT Filed: May 27, 2010

(86) PCT No.: PCT/JP2010/058957
§ 371 (c)(1),
(2), (4) Date: Dec. 15, 2011

(87) PCT Pub. No.: WO2010/146978
PCT Pub. Date: Dec. 23, 2010

(65) Prior Publication Data
US 2012/0107718 A1 May 3, 2012

(30) Foreign Application Priority Data
Jun. 19, 2009 (JP) ................................. 2009-146713

(51) Int. Cl.
*H01M 8/02* (2006.01)
*H01M 8/04* (2006.01)
*H01M 8/10* (2006.01)

(52) U.S. Cl.
CPC .......... *H01M 8/0276* (2013.01); *H01M 8/0202* (2013.01); *H01M 8/0247* (2013.01); *H01M 8/0267* (2013.01); *H01M 8/0284* (2013.01); *H01M 8/04029* (2013.01); *H01M 8/1002* (2013.01); *Y02E 60/521* (2013.01)

(58) Field of Classification Search
None
See application file for complete search history.

(56) References Cited

U.S. PATENT DOCUMENTS

| 2002/0122970 A1* | 9/2002 | Inoue et al. ..................... 429/35 |
| 2002/0127461 A1 | 9/2002 | Sugita et al. |
| 2003/0104262 A1 | 6/2003 | Kuroki et al. |
| 2005/0089745 A1 | 4/2005 | Sugita et al. |

(Continued)

FOREIGN PATENT DOCUMENTS

| CA | 2374790 A1 | 9/2002 |
| CA | 2412869 A1 | 12/2002 |
| EP | 1239529 A2 | 9/2002 |

(Continued)

*Primary Examiner* — Patrick Ryan
*Assistant Examiner* — Wyatt McConnell
(74) *Attorney, Agent, or Firm* — Harness, Dickey & Pierce, P.L.C.

(57) ABSTRACT

A fuel cell sealing structure has a power generating body, and first and second separators arranged in both sides in a thickness direction of the power generating body. On a surface in one side in a thickness direction of the first separator, formed integrally first and second sealing protrusions respectively brought into close contact with an outer peripheral portion of the power generating body and the second separator in an outer peripheral side of the first sealing protrusion, and a short circuit prevention rib protruding in line with the first and second sealing protrusions by an electrically insulating rubber-like elastic material. On a surface in another side thereof, formed integrally a third sealing protrusion brought into close contact with a surface in an opposite side to the power generating body in the second separator, by the electrically insulating rubber-like elastic material.

6 Claims, 6 Drawing Sheets

(56) References Cited

U.S. PATENT DOCUMENTS

2005/0249997 A1 11/2005 Tomimatsu et al.
2006/0108709 A1 5/2006 Inoue et al.

FOREIGN PATENT DOCUMENTS

| EP | 1296394 A1 | 3/2003 |
| JP | 2002-237317 A | 8/2002 |
| JP | 2002-270202 | 9/2002 |
| JP | 2004-265824 A | 9/2004 |
| JP | 2005-222708 A | 8/2005 |
| JP | 2005-276820 A | 10/2005 |
| JP | 2006-179497 A | 7/2006 |
| JP | 2007-172992 A | 7/2007 |
| WO | WO-02/01658 A1 | 1/2002 |

* cited by examiner

FUEL CELL SEALING STRUCTURE

CROSS-REFERENCE TO RELATED APPLICATIONS

This application is a U.S. National Stage Application of International application No. PCT/JP2010/058957, filed on May 27, 2010 and published in Japanese as WO/2010/146978 on Dec. 23, 2010. This application claims the benefit of Japanese Application No. 2009-146713, filed Jun. 19, 2009. The entire disclosures of the above applications are incorporated herein by reference.

BACKGROUND OF THE INVENTION

1. Field of the Invention

The present invention relates to a sealing structure for circulating each of a fuel gas, an oxidizing agent gas, a cooling medium and the like by an independent flow path, in a fuel cell.

2. Description of the Conventional Art

A fuel cell is provided with a sealing structure for circulating each of a fuel gas, an oxidizing agent gas, a cooling medium and the like by an independent flow path. FIG. 11 is a partly cross sectional view showing a fuel cell sealing structure in accordance with a prior art in a separated state, and FIG. 12 is a partly cross sectional view showing the same in a laminated state.

In these FIG. 11 and FIG. 12, reference numeral 110 denotes a power generating body obtained by laminating and integrating gas diffusion layers (GDL) 112 and 113 each of which is constructed by a porous body in both sides in a thickness direction of a membrane electrode assembly (MEA) 111 which is constructed by an electrolyte membrane and catalyst electrode layers provided in both surfaces thereof. Further, separators 120 and 130 each of which is constructed by a carbon or a conductive metal are laminated in both sides in a thickness direction of the power generating body 110, whereby a fuel battery cell 100 is constructed.

In each of the fuel battery cells 100, an outer peripheral portion of the membrane electrode assembly 111 in the power generating body 110 is pinched between a sealing protrusion 121 for an anode which is integrally formed in one separator 120 by a rubber-like elastic material (a rubber or a synthetic resin material having a rubber-like elasticity), and a sealing protrusion 131 for a cathode which is integrally formed in another separator 130 by the rubber-like elastic material.

Further, a fuel gas flow path 100*a* is defined by the sealing protrusion 121 for the anode between one catalyst electrode layer (an anode) in the membrane electrode assembly 111 and the one separator 120 which is opposed thereto, and an oxidizing agent gas flow path 100*b* is defined by the sealing protrusion 131 for the cathode between another catalyst electrode layer (a cathode) in the membrane electrode assembly 111 and the another separator 130 which is opposed thereto. Further, a sealing protrusion 122 for a cooling medium is integrally formed by the rubber-like elastic material on a surface which is opposed to the sealing protrusion 121 for the anode in the one separator 120, and a cooling medium flow path 100*c* is defined by the sealing protrusion 122 for the cooling medium between the separators 120 and 130 of the adjacent fuel battery cells 100 and 100.

In other words, this kind of fuel cell is structured such that a fuel gas (a hydrogen) circulating in the fuel gas flow path 100*a* is fed to the anode side of the membrane electrode assembly 111 via the gas diffusion layer 112, an oxidizing agent gas (an air) circulating in the oxidizing agent gas flow path 100*b* is fed to the cathode side of the membrane electrode assembly 111 via the gas diffusion layer 113, and an electric power is generated on the basis of a reverse reaction to an electrolytic process of a water, that is, a reaction for creating the water from hydrogen and oxygen, in each of the fuel battery cells 100. Further, an electromotive force by each of the fuel battery cells 100 is low, however, a necessary electromotive force can be obtained by laminating a lot of fuel battery cells 100 so as to connect electrically in series (refer, for example, to Japanese Unexamined Patent Publication No. 2005-222708).

However, in accordance with the conventional fuel cell sealing structure, it is necessary to integrally form the sealing protrusion 121 for the anode and the sealing protrusion 122 for the cooling medium in the one separator 120, and integrally form the sealing protrusion 131 for the cathode in the another separator 130.

Further, if the separators 120 and 130 become liable to be deformed by being thinned, end portions of the separators 120 and 130 in both sides of the power generating body 110 in the fuel battery cell 100 come into contact with each other so as to be electrically short circuited, and there is a risk that a power generating efficiency is lowered.

SUMMARY OF THE INVENTION

The present invention is made by taking the points mentioned above into consideration, and a technical object of the present invention is to provide sealing protrusions for an anode and a cathode and a sealing protrusion for a cooling medium concentrically in one separator, and to prevent the separators in both sides of a power generating body from coming into contact with each other so as to be electrically short circuited, in a fuel cell sealing structure.

Means for Solving the Problem

As a means for effectively solving the technical problem mentioned above, a fuel cell sealing structure according to the first aspect of the invention of the present application is structured such that it is provided with a power generating body having a membrane electrode assembly in which electrode layers are provided in both surfaces of an electrolyte membrane, and first and second separators arranged in both sides in a thickness direction of the power generating body, and on a surface in one side in a thickness direction of the first separator, there are integrally formed a first sealing protrusion which is brought into close contact with an outer peripheral portion of the power generating body, a second sealing protrusion which is brought into close contact with the second separator in an outer peripheral side of the first sealing protrusion, and a short circuit prevention rib which protrudes in line with the first and second sealing protrusions by an electrically insulating rubber-like elastic material, and on a surface in another side in the thickness direction of the first separator, there is integrally formed a third sealing protrusion which is brought into close contact with a surface in an opposite side to the power generating body in the second separator, by the electrically insulating rubber-like elastic material.

Further, a fuel cell sealing structure according to the second aspect of the invention of the present application is structured such that in the structure described in the first aspect of the invention, the first sealing protrusion, the second sealing protrusion and the short circuit prevention rib, and the third sealing protrusion are in succession with each other via a communication hole which is provided in the first separator.

Further, a fuel cell sealing structure according to the third aspect of the invention of the present application is structured such that in the structure described in the first aspect of the invention, a first retention portion and a second retention portion are formed in the first separator so as to be bent in an opposite side in the thickness direction to each other via a step portion, the first retention portion being integrated with the first sealing protrusion, the second sealing protrusion and the short circuit prevention rib and moving backward to an opposite side to a protruding direction of the first sealing protrusion, the second sealing protrusion and the short circuit prevention rib, and the second retention portion being integrated with the third sealing protrusion and moving backward to an opposite side to a protruding direction of the third sealing protrusion.

Further, a fuel cell sealing structure according to the fourth aspect of the invention of the present application is structured such that in the structure described in the first aspect of the invention, the third sealing protrusion is provided so as to be positioned between the first sealing protrusion and the second sealing protrusion.

Further, a fuel cell sealing structure according to the fifth aspect of the invention of the present application is structured such that in the structure described in the third aspect of the invention, the short circuit prevention rib is provided in such a manner as to cover the second retention portion from an opposite side to the third sealing protrusion.

Effect of the Invention

On the basis of the fuel cell sealing structure according to the first aspect of the invention, since it is possible to structure such that the first separator is provided with the first sealing protrusion which is brought into close contact with the outer peripheral portion of the power generating body, the second sealing protrusion which is brought into close contact with the second separator, and the third sealing protrusion which is brought into close contact with the surface in the opposed side to the power generating body in the second separator, that is, the sealing protrusions for the anode and the cathode and the sealing protrusion for the cooling medium are provided concentrically on one separator, it is possible to achieve a simplification of a gasket forming step and an improvement of an assembling, and it is possible to effectively prevent the first separator and the second separator in both sides of the power generating body from coming into contact with each other so as to be electrically short circuited, by the short circuit prevention rib which protrudes in line with the first and second sealing protrusions.

Further, on the basis of the fuel cell sealing structure according to the second of the invention, in addition to the effect by the structure of the first aspect of the invention, since the third sealing protrusion which is provided in the surface in the another side in the thickness direction in the first separator is in succession with the first sealing protrusion, the second sealing protrusion and the short circuit prevention rib which are provided in the surface in the one side in the thickness direction in the first separator, via the communication hole which is provided in the first separator, it is possible to simultaneously form the first sealing protrusion, the second sealing protrusion and the short circuit prevention rib, and the third sealing protrusion from one side of the first separator.

Further, on the basis of the fuel cell sealing structure according to the third aspect of the invention, in addition to the effect by the structure of the first aspect of the invention, since the first retention portion which is formed in the first separator moves backward to the opposite side to the protruding direction of the first and second sealing protrusions which are integrated therewith, a sufficient squeezing margin of the first and second sealing protrusion can be secured. Since the second retention portion which is formed in the first separator moves backward to the opposite side to the protruding direction of the third sealing protrusion which is integrated therewith, a sufficient squeezing margin of the third sealing protrusion can be secured. Further, since the first and second retention portions are bent to the opposite side to each other via the step portion, it is possible to suppress an increase of a laminating thickness.

Further, on the basis of the fuel cell sealing structure according to the fourth aspect of the invention, in addition to the effect by the structure of the first aspect of the invention, since the third sealing protrusion is provided so as to be positioned between the first sealing protrusion and the second sealing protrusion, compressing reaction forces of the first to third sealing protrusions are well balanced, whereby it is possible to further enhance a function of preventing the first separator and the second separator in both sides of the power generating body from being short circuited.

Further, on the basis of the fuel cell sealing structure according to the fifth aspect of the invention, in addition to the effect by the structure of the third aspect of the invention, since the short circuit prevention rib is provided in such a manner as to cover the second retention portion from the opposite side to the third sealing protrusion, it is possible to further enhance the function of preventing the first separator and the second separator in both sides of the power generating body from being short circuited, by pressing the second separator in a wide range in a width direction.

DETAILED DESCRIPTION OF PREFERRED EMBODIMENTS

A description will be given in detail below of preferable embodiments of a fuel cell sealing structure according to the present invention with reference to the accompanying drawings.

Figure 1:
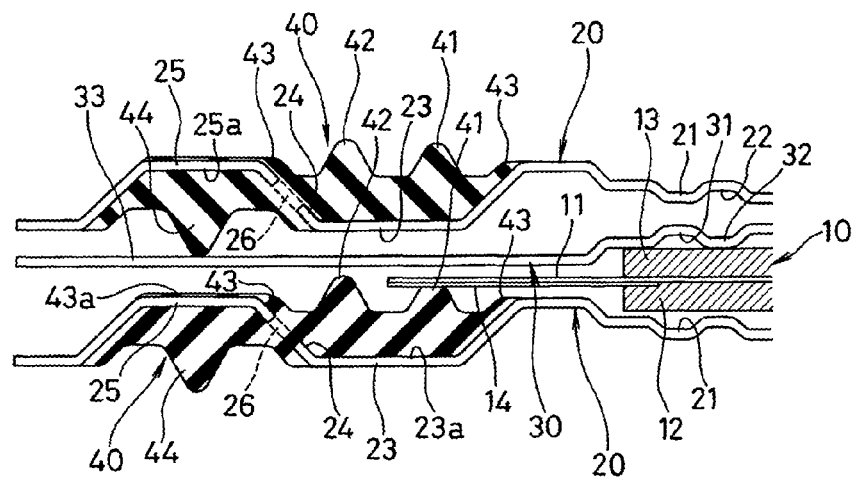
FIG. 1 is a partly cross sectional view showing a first embodiment of a fuel cell sealing structure according to the present invention in a separated state.
Figure 2:
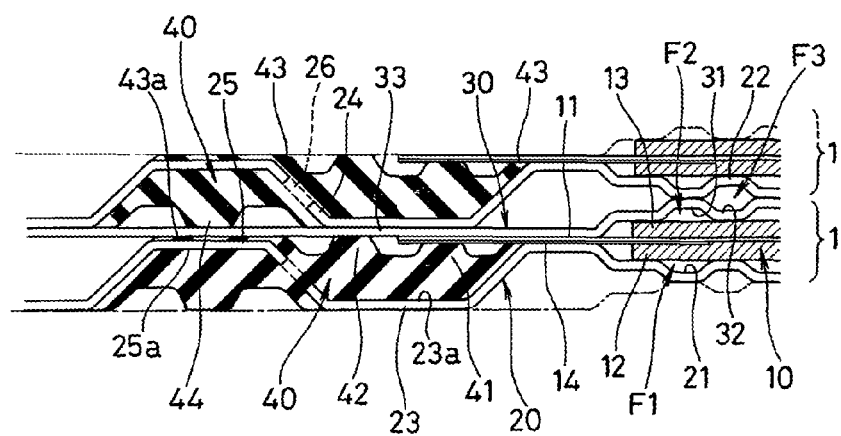
FIG. 2 is a partly cross sectional view showing the first embodiment of the fuel cell sealing structure according to the present invention in a laminated state.

First of all, FIG. 1 and FIG. 2 show a first embodiment of a fuel cell sealing structure according to the present invention, reference numeral 10 denotes a power generating body obtained by laminating and integrating gas diffusion layers (GDL) 12 and 13 each of which is constructed by a porous body in both sides in a thickness direction of a membrane electrode assembly (MEA) 11 which is constructed by an electrolyte membrane and catalyst electrode layers provided in both surfaces thereof, reference numeral 20 denotes a first separator which is arranged in one side in a thickness direction of the power generating body 10, and reference numeral 30 denotes a second separator which is arranged in the other side in the thickness direction of the power generating body 10.

The membrane electrode assembly 11 in the power generating body 10 is larger in its projected area in a thickness direction than the gas diffusion layers 12 and 13 in both sided thereof, and outer peripheral edge portions of the gas diffusion layers 12 and 13 are back away to an inner peripheral side from an outer peripheral edge portion of the membrane electrode assembly 11. Accordingly, an outer peripheral portion of the power generating body 10 is formed as a stepped shape, and an outer peripheral portion of the membrane electrode assembly 11 protrudes out of edge portions of the gas diffusion layers 12 and 13.

Figure 3:
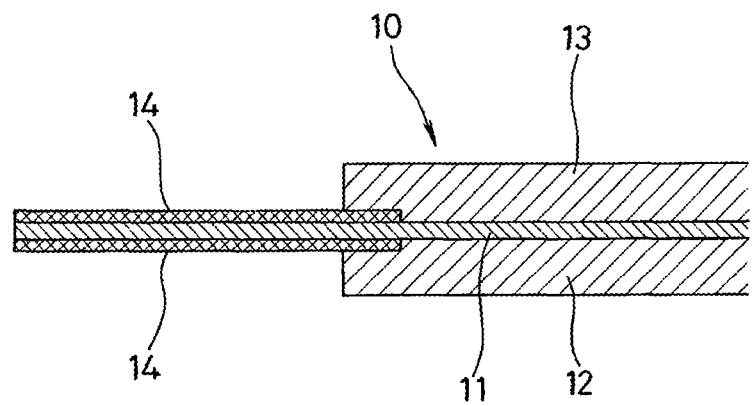
FIG. 3 is a partly cross sectional view showing an example of a reinforcing structure of a power generating body in the fuel cell sealing structure according to the present invention.
Figure 4:
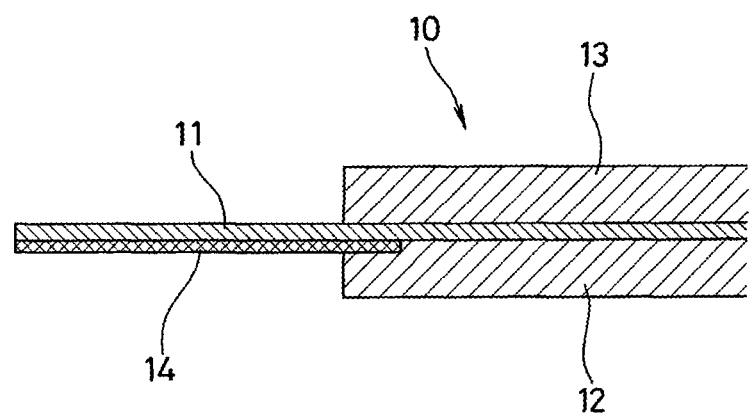
FIG. 4 is a partly cross sectional view showing another example of the reinforcing structure of the power generating body in the fuel cell sealing structure according to the present invention.

Further, the outer peripheral portion of the membrane electrode assembly 11 protruding out of the edge portions of the gas diffusion layers 12 and 13 is thermally compression bonded a reinforcing film 14 made of a synthetic resin at least on one surface thereof, as shown in FIG. 3 or FIG. 4, and an inner peripheral edge of the reinforcing film 14 is pinched between the edge portion of the gas diffusion layer 12 (and 13) and the membrane electrode assembly 11. In this case, in the case that the reinforcing film 14 is provided only in one surface as shown in FIG. 4, it is preferable to provide it in a side coming to a seal surface by a first sealing protrusion 41 mentioned below.

The first separator 20 is constructed by a metal plate having the conductivity such as a thin stainless steel plate or the like, a projected area in its thickness direction is larger than a projected area in the thickness direction of the power generating body 10 (the membrane electrode assembly 11), grooves 21 and 22 which are bent in an opposite side in the thickness direction to each other are alternately formed in a region corresponding to the gas diffusion layers 12 and 13 of the power generating body 10, a first retention portion 23 which is bent as a concave shape so as to be back away to an opposite side to an opposing direction to the power generating body 10 is formed in a region in an outer peripheral side thereof, and a second retention portion 25 which is bent as a concave shape to an opposite side to the first retention portion 23 is formed in a region in an outer peripheral side thereof via an inclined surface shaped step portion 24.

On the other hand, the second separator 30 is also constructed by the metal plate having the conductivity such as the thin stainless steel plate or the like which is the same as the first separator 20, a projected area in its thickness direction is approximately the same as the first separator 20, grooves 31 and 32 which are bent in an opposite side in the thickness direction to each other are alternately formed in a region corresponding to the gas diffusion layers 12 and 13 of the power generating body 10, and a flat flange portion 33 is formed in a region in an outer peripheral side thereof.

In a surface in one side in the thickness direction in the first separator 20, a groove-like backward surface 23a of the first retention portion 23 is integrally provided with a mountain-like first sealing protrusion 41 which is brought into close contact with an outer peripheral portion of the power generating body 10 (the reinforcing film 14 thermally compression bonded to the outer peripheral portion of the membrane electrode assembly 11), a mountain-like second sealing protrusion 42 which is brought into close contact with the flange portion 33 of the second separator 30 in an outer peripheral side of the first sealing protrusion 41, and a short circuit prevention rib 43 which is protruded in line with both sides in a width direction of the first and second sealing protrusions 41 and 42. Further, a part 43a of the short circuit prevention rib 43 existing in an outer peripheral side of the second sealing protrusion 42 extends like a membrane, and is deposited in such a manner as to cover a relative convex surface by the second retention portion 25.

Further, heights of the short circuit prevention rib 43 and the membrane-like part 43a are higher than a forming region of the grooves 21 and 22 in the first separator 20, and are lower than the first and second sealing protrusions 41 and 42 only at a degree which approximately corresponds to a squeezing margin of the first and second sealing protrusions 41 and 42 in a laminated state in FIG. 2.

Further, a mountain-like third sealing protrusion 44 which is brought into close contact with a surface in an opposite side to the power generating body 10 in the flange portion 33 of the second separator 30 is integrally provided in a groove-like backward surface 25a of the second retention portion 25, in the surface in the another side in the thickness direction in the first separator 20. A height of the third sealing protrusion 44 is higher than relative convex surfaces in both sides of the second retention portion 25 only at a degree which corresponds to the squeezing margin in the laminated state in FIG. 2.

The first sealing protrusion 41, the second sealing protrusion 42 and the short circuit prevention rib 43, and the third sealing protrusion 44 which are provided in the surfaces in the opposite sides to each other in the first separator 20 construct a gasket 40 which is in succession with each other via a communication hole 26 provided in the step portion 24 between the first retention portion 23 and the second retention portion 25 of the first separator 20, and is integrally formed by an electrically insulating rubber-like elastic material (a rubber or a synthetic resin material having a rubber-like elasticity).

Further, as shown in FIG. 2, a fuel battery cell (a single cell) 1 is constructed by the power generating body 10, and the first separator 20 and the second separator 30 which are laminated in both sides in the thickness direction thereof, and a lot of the fuel battery cells 1 are laminated, whereby a fuel battery stack is constructed. In this laminated state, the fuel battery cells 1 which are adjacent to each other, in other words, the first separator 20 in one fuel battery cell 1 and the second separator 30 in the fuel battery cell 1 which is adjacent thereto are brought into contact with each other, whereby the adjacent fuel battery cells 1 are connected electrically in series.

In each of the fuel battery cells 1, the outer peripheral portion of the membrane electrode assembly 11 in the power generating body 10 is pinched between the first sealing protrusion 41 of the gasket 40 which is provided integrally in the first separator 20, and the flange portion 33 in the second separator 30, and the gas diffusion layers 12 and 13 in the power generating body 10 is pinched between a region in which the grooves 21 and 22 are formed in the first separator 20, and a region in which the grooves 31 and 32 are formed in the second separator 30, in an appropriately compressed state.

A flow path F1 of a fuel gas including a hydrogen (or an oxidizing agent gas including an oxygen) is formed between the one gas diffusion layer 12 in the power generating body 10 and the grooves 21 of the first separator 20 coming into contact with the one gas diffusion layer 12, and a region in which the flow path F1 is formed is zoned independently from the other region by the first sealing protrusion 41 which is brought into close contact with the reinforcing film 14 thermally compression bonded to the outer peripheral portion of the membrane electrode assembly 11 in the power generating body 10 by an appropriate squeezing margin. In other words, the first sealing protrusion 41 corresponds to a sealing protrusion for the anode (or the cathode), and is structured such that the fuel gas (or the oxidizing agent gas) is fed to the anode (or the cathode) corresponding to a catalyst electrode layer in a side of the gas diffusion layer 12 in the membrane electrode assembly 11 via the flow path F1 and the gas diffusion layer 12.

Further, a flow path F2 of the oxidizing agent gas including the oxygen (or the fuel gas including the hydrogen) is formed between the another gas diffusion layer 13 in the power generating body 10 and the grooves 31 of the second separator 30 coming into contact with the another gas diffusion layer 13, and a region in which the flow path F2 is formed is zoned independently from the other region by the second sealing protrusion 42 which is brought into close contact with the flange portion 33 in the second separator 30 by an appropriate squeezing margin. In other words, the second sealing protrusion 42 corresponds to the sealing protrusion for the cathode (or the anode), and is structured such that the oxidizing agent gas (or the fuel gas) is fed to the cathode (or the anode) corresponding to the catalyst electrode layer in a side of the gas diffusion layer 13 in the membrane electrode assembly 11 via the flow path F2 and the gas diffusion layer 13.

Further, a flow path F3 of a cooling medium (a cooling water) is formed between the fuel battery cells 1 and 1 which are adjacent to each other, by the grooves 22 of the first separator 20 and the grooves 32 of the second separator 30 which is brought into contact with the first separator 20, and a region in which the flow path F3 is formed is zoned in the flange portion 33 in the second separator 30, independently from the other region, by the third sealing protrusion 44 which is brought into close contact with the second sealing protrusion 42 at an appropriate squeezing margin from the opposite side. In other words, the third sealing protrusion 44 corresponds to a sealing protrusion for a cooling medium.

In other words, in the first embodiment structured as mentioned above, each of the fuel battery cells 1 is structured such that the fuel gas including the hydrogen (or the oxidizing agent gas including the oxygen) is fed to the anode (or the cathode) in the membrane electrode assembly 11 of the power generating body 10 via the flow path F1 and the gas diffusion layer 12, the oxidizing agent gas including the oxygen (or the fuel gas including the hydrogen) is fed to the cathode (or the anode) in the membrane electrode assembly 11 via the flow path F2 and the gas diffusion layer 13, and an electric power is generated on the basis of an electrochemical reaction corresponding to a reverse reaction to an electrolysis of the water, that is, a reaction of creating the water from the hydrogen and the oxygen. Further, a reaction heat generated at this time is removed by the cooling medium which circulates in the flow path F3.

Further, since the gasket 40 provided integrally in the first separator 20 is provided concentrically with the first sealing protrusion 41 which defines the independent flow path F1 by being brought into close contact with the outer peripheral portion (the reinforcing film 14) of the membrane electrode assembly 11 in the power generating body 10, the second sealing protrusion 42 which defines the independent flow path F2 by being brought into close contact with the flange portion 33 in the second separator 30, and the third sealing protrusion 44 which defines the independent flow path F3 by being brought into close contact with the flange portion 33 from the opposite side to the second sealing protrusion 42, it is not necessary that the gasket is provided separately in the other laminated part (the second separator 30 or the like).

Further, since the first sealing protrusion 41, the second sealing protrusion 42 and the short circuit prevention rib 43 which are provided in the surface in the one side in the thickness direction in the first separator 20 so as to be positioned in the first retention portion 23 are in succession with the third sealing protrusion 44 which is provided in the surface in the another side so as to be positioned in the second retention portion 25, via the communication hole 26 which is provided in the step portion 24 between the first retention portion 23 and the second retention portion 25, it is not necessary to carry out the formation of the first sealing protrusion 41, the second sealing protrusion 42 and the short circuit prevention rib 43, and the third sealing protrusion 44, from both sides of the first separator 20, but it is possible to simultaneously form from one side of the first separator 20. Further, since the communication hole 26 coming to a circulation passage of a molding material is provided in the step portion 24, the molding material flow well, and it is possible to improve quality of the gasket 40.

Further, since the first retention portion 23 which is formed in the first separator 20 so as to be bent goes back to the opposite side to the protruding direction of the first and second sealing protrusions 41 and 42 which are integrated with the first retention portion 23, it is possible to secure a sufficient volume and squeezing margin of the first and second sealing protrusions 41 and 42. In the same manner, since the second retention portion 25 which is formed in the first separator 20 goes back to the opposite side to the protruding direction of the third sealing protrusion 44 which is integrated with the second retention portion 25, it is possible to secure a sufficient volume and squeezing margin of the third sealing protrusion 44. Further, since these first and second retention portions 23 and 25 are bent to the opposite side to each other via the step portion 24, a thickness of the gasket 40 does not become large, in spite that the first and second sealing protrusions 41 and 42 and the third sealing protrusion 44 are provided in the reverse directions to each other. Therefore, it is possible to suppress an increase of a laminating thickness of the fuel battery cell 1.

Further, the short circuit prevention rig 43 formed in this gasket 40 is structured such as to suppress a deformation thereof by being brought into close contact with the outer peripheral portion (the reinforcing film 14) of the membrane electrode assembly 11 in the power generating body 10 and the flange portion 33 in the second separator 30 in both sides of the first and second sealing protrusions 41 and 42. Further, since the part 43a of the short circuit prevention rib 43 is extended like a membrane in such a manner as to cover the second retention portion 25 in the first separator 20 from the opposite side to the third sealing protrusion 44, and is interposed with respect to the flange portion 33 in the second separator 30, it is possible to effectively prevent an electric short circuit within the fuel battery cell 1 on the basis of a contact between the end portions of the first separator 20 and the second separator 30 which are provided in both sides of the power generating body 10.

Figure 5:
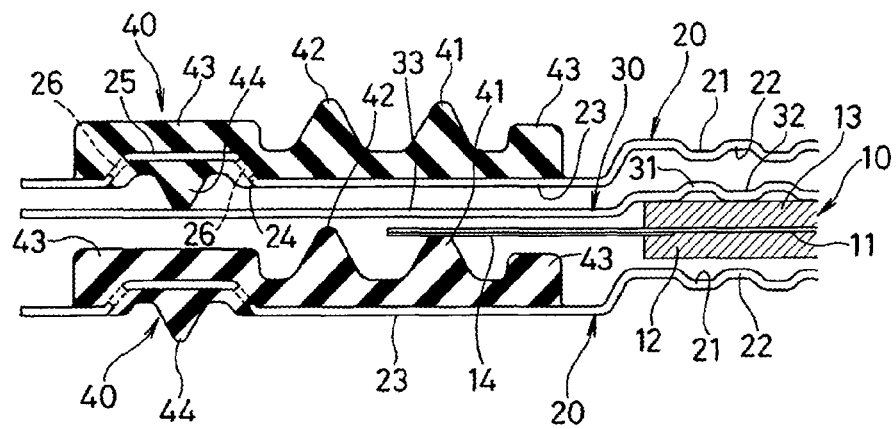
FIG. 5 is a partly cross sectional view showing a second embodiment of the fuel cell sealing structure according to the present invention in a separated state.
Figure 6:
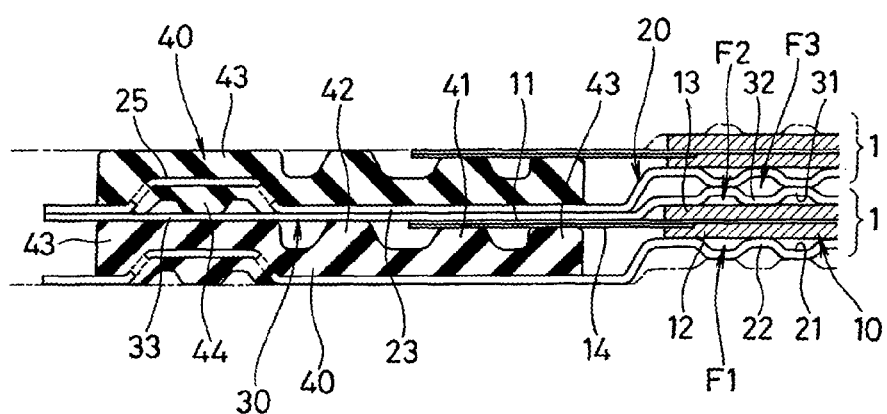
FIG. 6 is a partly cross sectional view showing the second embodiment of the fuel cell sealing structure according to the present invention in a laminated state.

Next, FIG. 5 and FIG. 6 show a second embodiment of the fuel cell sealing structure according to the present invention, and differences in this embodiment from the previously described first embodiment exist in a point that in a pair of short circuit prevention ribs 43 formed in both sides in the width direction of the first and second sealing protrusions 41 and 42 in the gasket 40, the short circuit prevention rib 43 in an inner peripheral side rises up from the first retention portion 23, and the short circuit prevention rib 43 in an outer peripheral side is formed in such a manner as to cover a relative convex surface by the second retention portion 25 from an inner peripheral side thereof to an outer peripheral side.

Accordingly, in this second embodiment, it is possible to achieve an effect which is basically the same as the first embodiment. In addition thereto, since the short circuit prevention rib 43 existing in an outer peripheral side of the second sealing protrusion 42 is formed sufficiently wide in such a manner as to cover the relative convex surface by the second retention portion 25 from the inner peripheral side thereof to the outer peripheral side, it is possible to further enhance the function of preventing the short circuit between the end portions of the first separator 20 and the second separator 30 in the fuel battery cells 1.

Figure 7:
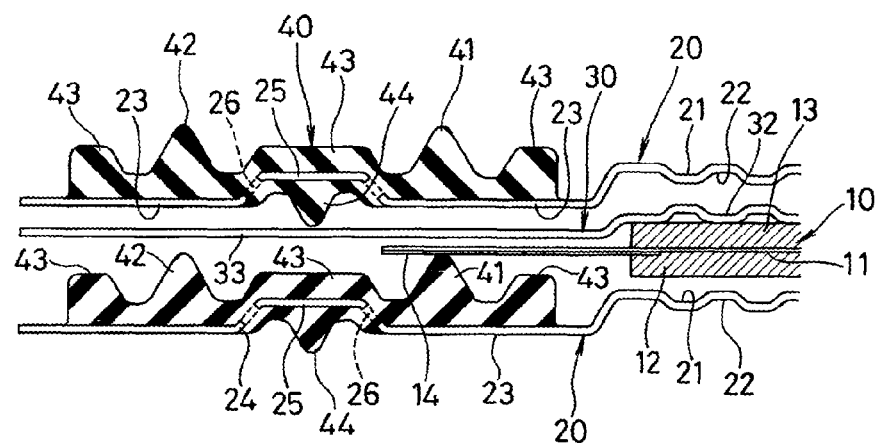
FIG. 7 is a partly cross sectional view showing a third embodiment of the fuel cell sealing structure according to the present invention in a separated state.
Figure 8:
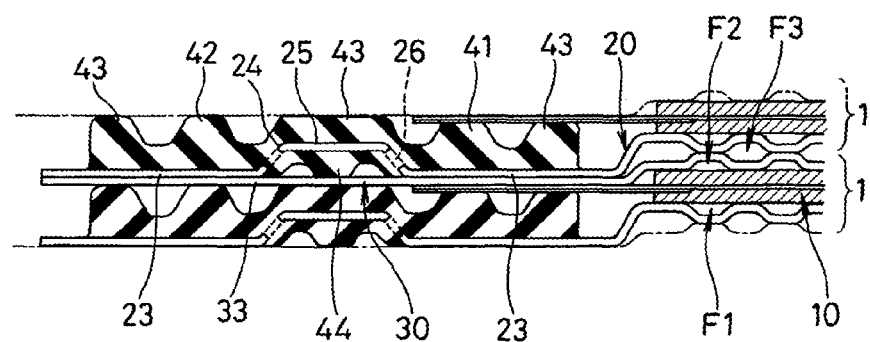
FIG. 8 is a partly cross sectional view showing the third embodiment of the fuel cell sealing structure according to the present invention in a laminated state.

Next, FIG. 7 and FIG. 8 show a third embodiment of the fuel cell sealing structure according to the present invention. In this embodiment, describing a point which is different from the previously described first embodiment, the second retention portion 25 which is bent as a concave shape to the opposite side to the first retention portion 23 is formed in an intermediate region in the width direction of the first retention portion 23 in the first separator 20, via an inclined surface shaped step portion 24.

The first sealing protrusion 41 and the short circuit prevention rib 43 in an inner peripheral side thereof are integrally provided in a region in an inner peripheral side from the second retention portion 25 in the first retention portion 23, the second sealing protrusion 42 and the short circuit prevention rib 43 in an outer peripheral side of the second sealing protrusion 42 are integrally provided in a region in an outer peripheral side of the second retention portion 25 in the first retention portion 23, the intermediate short circuit prevention rib 43 formed in such a manner as to cover the relative convex surface to the second retention portion 25 is integrally provided between the first sealing protrusion 41 and the second sealing protrusion 42, and the third sealing protrusion 44 which is inverted to the first and second sealing protrusions 41 and 42 is integrally provided in the second retention portion 25 so as to be positioned in an opposite side to the intermediate short circuit prevention rib 43. Further, the first sealing protrusion 41 and the short circuit prevention rib 43 in the inner peripheral side thereof, and the second sealing protrusion 42 and the short circuit prevention rib 43 in the outer peripheral side thereof construct the gasket 40 which is in succession with the third sealing protrusion 44 via the communication hole 26 provided in the step portions 24 in both sides of the second retention portion 25.

The other structures in the third embodiment are the same as the previously described first embodiment.

Accordingly, the third embodiment can basically achieve the same effect as the first embodiment. In addition, since the third sealing protrusion 44 is positioned between the first sealing protrusion 41 and the second sealing protrusion 42, the compression reaction forces of these sealing protrusions 41, 44 and 42 are well balanced, whereby it is possible to further enhance the function of preventing the end portions of the first separator 20 and the second separator 30 from being short circuited in the fuel battery cell 1.

Figure 9:
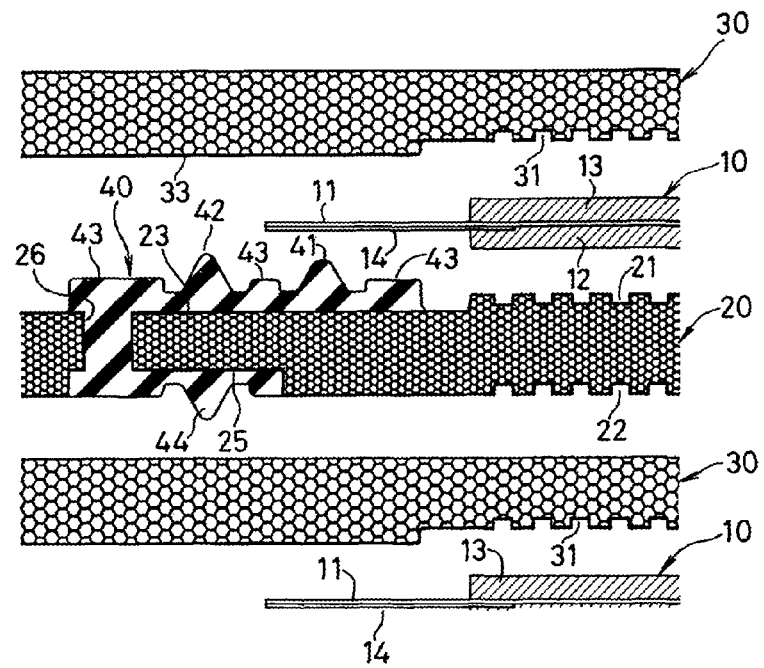
FIG. 9 is a partly cross sectional view showing a fourth embodiment of the fuel cell sealing structure according to the present invention in a separated state.
Figure 10:
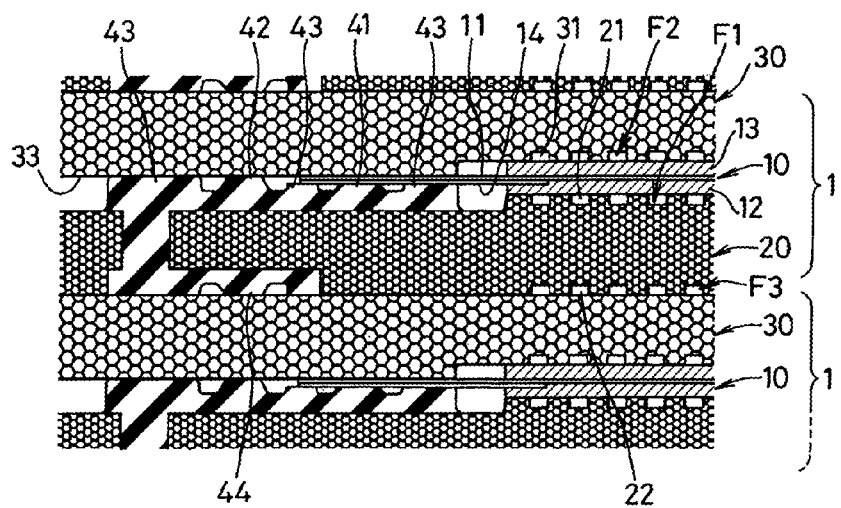
FIG. 10 is a partly cross sectional view showing the fourth embodiment of the fuel cell sealing structure according to the present invention in a laminated state.
Figure 11:
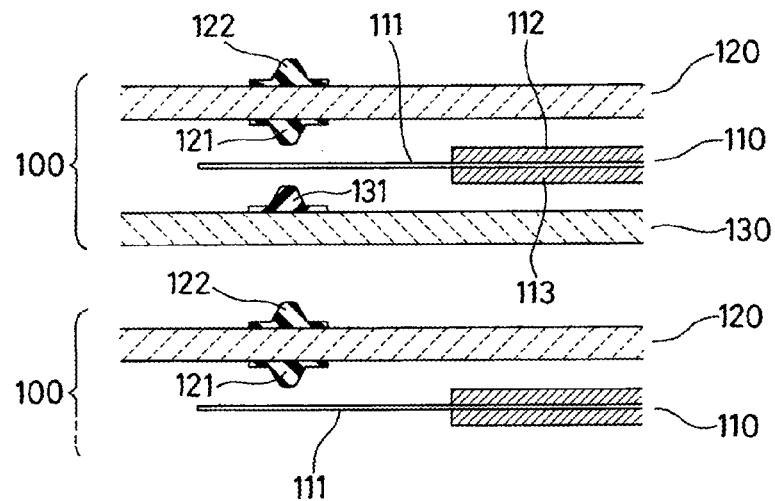
FIG. 11 is a partly cross sectional view showing a fuel cell sealing structure in accordance with a prior art in a separated state.
Figure 12:
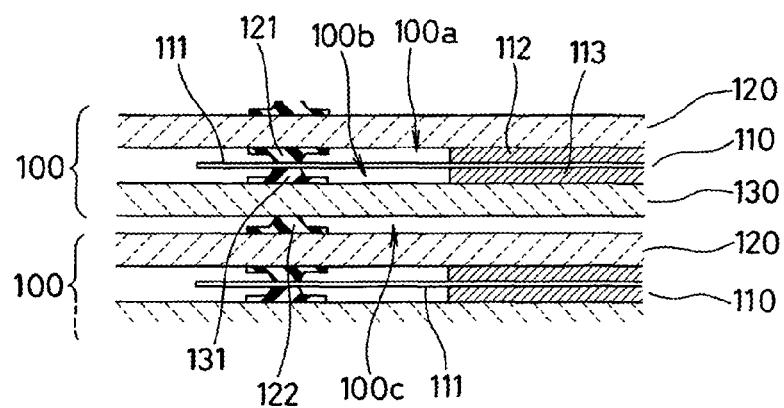
FIG. 12 is a partly cross sectional view showing the fuel cell sealing structure in accordance with the prior art in a laminated state.

Next, FIG. 9 and FIG. 10 show a fourth embodiment of the fuel cell sealing structure according to the present invention. In this embodiment, describing a different point from the previously described first to third embodiments, the first separator 20 is formed by a carbon, a projected area in a thickness direction thereof is larger than a projected area in a thickness direction of the power generating body 10 (the membrane electrode assembly 11), grooves 21 are formed in an opposed surface to the gas diffusion layer 12 of the power generating body 10 in the first separator 20, grooves 22 are formed in a surface in an opposite side thereto, a flat first retention portion 23 which goes back to an opposite side to the opposing direction to the power generating body 10 from the region is formed in an outer peripheral side of the region in which the grooves 21 are formed, and a second retention portion 25 which is depressed from the surface in which the grooves 22 are formed is formed in a surface in an opposite side thereto.

On the other hand, the second separator 30 is formed by the carbon in the same manner as the first separator 20, a projected area in a thickness direction thereof is approximately the same as the first separator 20, grooves 31 are formed in an opposed surface to the gas diffusion layer 13 of the power generating body 10, and a flat flange portion 33 which protrudes at a smaller protruding amount than a thickness of the gas diffusion layer 13 to the opposing direction to the power generating body 10 is formed in a region in an outer peripheral side thereof.

The first retention portion 23 in the first separator 20 (the surface in one side in the thickness direction) is provided integrally with a mountain-like first sealing protrusion 41 which is brought into close contact with an outer peripheral portion of the power generating body 10 (the reinforcing film 14 which is thermally compression bonded to the outer peripheral portion of the membrane electrode assembly 11), a mountain-like second sealing protrusion 42 which is brought into close contact with the flange portion 33 of the second separator 30 in an outer peripheral side of the first sealing protrusion 41, and short circuit prevention ribs 43 which protrude in line in both sides in the width directions of the first and second sealing protrusions 41 and 42, and between the first and second sealing protrusions 41 and 42. A height of the short circuit prevention rib 43 is slightly higher than the forming region of the grooves 21 in the first separator 20, and becomes lower than a squeezing margin of the first and second sealing projections 41 and 42 in a laminated state in FIG. 10 while taking into consideration the squeezing margin.

Further, the second retention portion 25 (the surface in the other thickness direction side) in the first separator 20 is provided integrally with a mountain-like third sealing protrusion 44 having a height which can come into close contact with the surface in the opposite side to the power generating body 10 in the flange portion 33 of the second separator 30. A height of the third sealing protrusion 44 becomes higher than a depth of the second retention portion 25 only at a degree corresponding to the squeezing margin in the laminated state in FIG. 10.

The first sealing protrusion 41, the second sealing protrusion 42 and the short circuit prevention rib 43, and the third sealing protrusion 44 which are provided in the opposite side surfaces in the first separator 20 construct the gaskets 40 which are in succession with each other via the communication hole 26 which is provided between the first retention portion 23 and the second retention portion 25 of the first separator 20, and are integrally formed by a rubber-like elastic material (a rubber or a synthetic resin material having a rubber-like elasticity).

Further, as shown in FIG. 10, a fuel battery cell (a single cell) 1 is constructed by the power generating body 10, and the first separator 20 and the second separator 30 which are laminated in both sides in the thickness direction thereof, and a lot of fuel battery cells 1 are laminated, whereby a fuel battery stack is constructed. In this laminated state, the fuel battery cells 1 which are adjacent to each other, in other words, the first separator 20 in one fuel battery cell 1 and the second separator 30 in the fuel battery cell 1 which is adjacent thereto are brought into contact with each other, whereby the adjacent fuel battery cells 1 are connected electrically in series.

In each of the fuel battery cells 1, the outer peripheral portion of the membrane electrode assembly 11 in the power generating body 10 is pinched between the first sealing protrusion 41 and the short circuit prevention ribs 43 in both sides in the width direction thereof (the inner and outer peripheries) of the gasket 40 which is provided integrally in the first separator 20, and the flange portion 33 in the second separator 30, and the gas diffusion layers 12 and 13 in the power generating body 10 is pinched between a region in which the grooves 21 are formed in the first separator 20, and a region in which the grooves 31 are formed in the second separator 30, in an appropriately compressed state.

Further, a flow path F1 of a fuel gas including a hydrogen (or an oxidizing agent gas including an oxygen) is formed between the one gas diffusion layer 12 in the power generating body 10 and the grooves 21 of the first separator 20 coming into contact with the one gas diffusion layer 12, and a region in which the flow path F1 is formed is zoned independently from the other region by the first sealing protrusion 41 which is brought into close contact with the reinforcing film 14 thermally compression bonded to the outer peripheral portion of the membrane electrode assembly 11 in the power generating body 10 by an appropriate squeezing margin. Further, it is structured such that the fuel gas (or the oxidizing agent gas) is fed to a catalyst electrode layer in a side of the gas diffusion layer 12 in the membrane electrode assembly 11 via the flow path F1 and the gas diffusion layer 12.

Further, a flow path F2 of the oxidizing agent gas including the oxygen (or the fuel gas including the hydrogen) is formed between the other gas diffusion layer 13 in the power generating body 10 and the grooves 31 of the second separator 30 coming into contact with the other gas diffusion layer 13, and a region in which the flow path F2 is formed is zoned independently from the other region by the second sealing protrusion 42 which is brought into close contact with the flange portion 33 in the second separator 30 by an appropriate squeezing margin. Further, it is structured such that the oxidizing agent gas (or the fuel gas) is fed to the catalyst electrode layer in a side of the gas diffusion layer 13 in the membrane electrode assembly 11 via the flow path F2 and the gas diffusion layer 13.

Further, a flow path F3 of a cooling medium (a cooling water) is formed between the fuel battery cells 1 and 1 which are adjacent to each other, by the grooves 22 of the first separator 20 and the second separator 30 which is brought into contact with the first separator 20, and a region in which the flow path F3 is formed is zoned in the flange portion 33 in the second separator 30, independently from the other region, by the third sealing protrusion 44 which is brought into close contact with the second sealing protrusion 42 at an appropriate squeezing margin from the opposite side.

In the fourth embodiment structured as mentioned above, since the gasket 40 provided integrally in the first separator 20 is provided concentrically with the first sealing protrusion 41 which defines the independent flow path F1 by being brought into close contact with the outer peripheral portion (the reinforcing film 14) of the membrane electrode assembly 11 in the power generating body 10, the second sealing protrusion 42 which defines the independent flow path F2 by being brought into close contact with the flange portion 33 in the second separator 30, and the third sealing protrusion 44 which defines the independent flow path F3 by being brought into close contact with the flange portion 33 from the opposite side to the second sealing protrusion 42, it is not necessary that the gasket is provided separately in the other laminated part (the second separator 30 or the like).

Further, since the first sealing protrusion 41, the second sealing protrusion 42 and the short circuit prevention rib 43 which are provided in the surface in the one side in the thickness direction in the first separator 20 so as to be positioned in the first retention portion 23 are in succession with the third sealing protrusion 44 which is provided in the surface in the other side so as to be positioned in the second retention portion 25, via the communication hole 26, it is not necessary to carry out the formation of the first sealing protrusion 41, the second sealing protrusion 42 and the short circuit prevention rib 43, and the third sealing protrusion 44, from both sides of the first separator 20, but it is possible to simultaneously form from one side of the first separator 20.

Further, since the first retention portion 23 which is formed in the first separator 20 goes back to the opposite side to the protruding direction of the first and second sealing protrusions 41 and 42 which are integrated with the first separator 20, it is possible to secure a sufficient volume and squeezing margin of the first and second sealing protrusions 41 and 42. In the same manner, since the second retention portion 25 which is formed in the first separator 20 goes back to the opposite side to the protruding direction of the third sealing protrusion 44 which is integrated with the second retention portion 25, it is possible to secure sufficient volume and squeezing margin of the third sealing protrusion 44. Further, since these first and second retention portions 23 and 25 are formed in such a manner as to reduce a thickness of the first separator 20, it is possible to suppress an increase of a laminating thickness of the fuel battery cell 1.

Further, since the short circuit prevention rig 43 formed in this gasket 40 is structured such as to suppress a deformation thereof by being brought into close contact with the outer peripheral portion (the reinforcing film 14) of the membrane electrode assembly 11 in the power generating body 10 and the flange portion 33 in the second separator 30, and is formed alternately with the first and second sealing protrusions 41 and 42, from the inner peripheral side to the outer peripheral side of the first and second sealing protrusions 41 and 42, it is possible to support in a wide range in the width direction. Further, since it is made of the rubber-like elastic material corresponding to an electrically insulating material, it is possible to effectively prevent an electric short circuit on the basis of a contact between the first separator 20 and the second separator 30 in both sides of the power generating body 10.

What is claimed is:

1. A fuel cell sealing structure comprising:
a power generating body having a membrane electrode assembly provided with electrode layers on both surfaces of an electrolyte membrane; and
first and second separators arranged on both sides in a thickness direction of said power generating body,
wherein a first sealing protrusion is provided on a first surface of said first separator, said first sealing protrusion being brought into close contact with an outer peripheral portion of said power generating body,
a second sealing protrusion is provided on said first surface of said first separator, said second sealing protrusion being brought into close contact with said second separator on an outer peripheral side of said first sealing protrusion,
a short circuit prevention rib is provided on said first surface of said first separator, said short circuit prevention rib, said first sealing protrusion, and said second sealing protrusion all protruding in a first direction away from the first surface of the first separator,
a third sealing protrusion is provided on a second surface of said first separator, the second surface being opposite the first surface, said third sealing protrusion protruding in a second direction opposite to the first direction, and
the first sealing protrusion, the second sealing protrusion, the short circuit prevention rib and the third sealing protrusion are integral with one another and formed of an electrically insulating rubber-like elastic material,
wherein the first separator includes:
a first retention portion recessed in the second direction, and
a second retention portion recessed in the first direction, and
wherein the first sealing protrusion, the second sealing protrusion and the short circuit prevention rib all protrude from within the first retention portion, and
the third sealing protrusion protrudes from within the second retention portion.

2. The fuel cell sealing structure as claimed in claim 1, wherein the first separator includes at least one communication hole formed therethrough, and
the first sealing protrusion, the second sealing protrusion, the short circuit prevention rib, and the third sealing protrusion are continuous with each other via said at least one communication hole which is provided through said first separator.

3. A fuel cell sealing structure comprising:
a power generating body having a membrane electrode assembly provided with electrode layers on both surfaces of an electrolyte membrane; and
first and second separators arranged on both sides in a thickness direction of said power generating body,
wherein a first sealing protrusion is provided on a first surface of said first separator, said first sealing protrusion being brought into close contact with an outer peripheral portion of said power generating body,
a second sealing protrusion is provided on said first surface of said first separator, said second sealing protrusion being brought into close contact with said second separator on an outer peripheral side of said first sealing protrusion,
a short circuit prevention rib is provided on said first surface of said first separator, said short circuit prevention rib, said first sealing protrusion, and said second sealing protrusion all protruding in a first direction away from the first surface of the first separator,
a third sealing protrusion is provided on a second surface of said first separator, the second surface being opposite the first surface, said third sealing protrusion protruding in a second direction opposite to the first direction, and
the first sealing protrusion, the second sealing protrusion, the short circuit prevention rib and the third sealing protrusion are integral with one another and formed of an electrically insulating rubber-like elastic material,
wherein the short circuit prevention rib includes a planar membrane entirely covering a recessed portion of the first separator recessed in the first direction and integrated with the third protrusion.

4. A fuel cell sealing structure comprising:
a power generating body including:
an electrolyte membrane; and
electrode layers on opposite surfaces of the electrolyte membrane;
first and second separators on opposite sides of said power generating body; and
a gasket integrated with the first separator, the gasket including:
a first sealing protrusion provided on a first surface of said first separator and protruding in a first direction;
a second sealing protrusion provided on said first surface of said first separator and protruding in said first direction;
a short circuit prevention rib provided on said first surface of said first separator and protruding in said first direction; and
a third sealing protrusion provided on a second surface of said first separator and protruding in a second direction opposite to the first direction, the second surface being opposite the first surface,
wherein the first separator includes:
a first concavity recessed in the second direction, the first sealing protrusion, the second sealing protrusion and the short circuit prevention rib all protruding from within the first concavity;
a second concavity recessed in the first direction, the third sealing protrusion protruding from within the second concavity; and
a step portion extending between the first and second concavities, the step portion including at least one communication hole formed therethrough, and
wherein the first sealing protrusion, the second sealing protrusion, the short circuit prevention rib and the third sealing protrusion are monolithically continuous with one another via said at least one communication hole and formed of an electrically insulating rubber-like elastic material.

5. The fuel cell sealing structure as claimed in claim 4, wherein the short circuit prevention rib extends along the first surface of the first separator so as to cover the second retention portion.

6. A fuel cell sealing structure comprising:
a power generating body having a membrane electrode assembly provided with electrode layers on both surfaces of an electrolyte membrane; and
first and second separators arranged on both sides in a thickness direction of said power generating body,
wherein a first sealing protrusion is provided on a first surface of said first separator, said first sealing protrusion being brought into close contact with an outer peripheral portion of said power generating body,
a second sealing protrusion is provided on said first surface of said first separator, said second sealing protrusion being brought into close contact with said second separator on an outer peripheral side of said first sealing protrusion, a short circuit prevention rib is provided on said first surface of said first separator, said short circuit prevention rib, said first sealing protrusion, and said second sealing protrusion all protruding in a first direction away from the first surface of the first separator, a third sealing protrusion is provided on a second surface of said first separator, the second surface being opposite the first surface, said third sealing protrusion protruding in a second direction opposite to the first direction, and the first sealing protrusion, the second sealing protrusion, the short circuit prevention rib and the third sealing protrusion are integral with one another and formed of an electrically insulating rubber-like elastic material, wherein the third sealing protrusion protrudes from a position between the first sealing protrusion and the second sealing protrusion.

* * * * *